J. W. WILSON.
FLYING MACHINE.
APPLICATION FILED APR. 23, 1910.

1,055,379.

Patented Mar. 11, 1913.
9 SHEETS—SHEET 2.

Witnesses:
H. B. Davis.
P. S. Peterson.

Inventor:
John W. Wilson
by Noyes & Harriman
attys.

Fig. 20.

J. W. WILSON.
FLYING MACHINE.
APPLICATION FILED APR. 23, 1910.

1,055,379.

Patented Mar. 11, 1913.
9 SHEETS—SHEET 9.

Witnesses:
H. B. Davis
D. S. Peterson.

Inventor:
John W. Wilson
By Hayes & Harriman
Attys

UNITED STATES PATENT OFFICE.

JOHN W. WILSON, OF BOSTON, MASSACHUSETTS.

FLYING-MACHINE.

1,055,379. Specification of Letters Patent. Patented Mar. 11, 1913.

Application filed April 23, 1910. Serial No. 557,135.

*To all whom it may concern:*

Be it known that I, JOHN W. WILSON, of Boston, in the county of Suffolk and State of Massachusetts, have invented an Improvement in Flying-Machines, of which the following is a specification.

This invention relates to flying-machines of the heavier-than-air type, and in some particulars is intended as an improvement upon the flying-machine shown in Letters Patent #970,771, dated September 10, 1910.

The invention has for its main object the provision of novel means for the manipulation of the planes for the purpose of maintaining lateral balance, and for steering the machine around corners, and also to enable the machine to be lifted short distances to assist it in soaring while in flight.

The invention also has for its object the provision of floats whereby the machine may float on the water, and also in the construction of the floats whereby they are made to serve as supporting-planes.

The invention also has for its object the provision of vertical rudders which are movable on axes oblique to the perpendicular, for assisting in controlling the movements of the machine while in the air.

The invention also has for its object the provision of a transversely-bendable tail-piece and operating-means therefor.

The principles of my invention may be embodied in many different types of machines, and in some of them the planes which are provided with my improved supporting-means and operating-means may serve as main supporting-planes and in others as a front control; but as the principles involved are substantially the same, I do not limit my invention to the type of machine in which they are embodied, or to the location of the planes.

Fig. 11 is a modification of the machine shown in Fig. 1, Figs. 12 and 13 are details to be referred to, Figs. 14 and 15 are details of modified means for moving the planes on axes oblique to the perpendicular in lieu of employing oblique shafts, Figs. 17 and 18 are details of the same to be referred to, Fig. 19 is a side view of another modified form of machine embodying my invention.

21 represents the main frame-work, and 22 a propeller which is secured to a propeller-shaft 23, adapted to be driven by a motor 24, all of which parts may be of any usual or suitable construction.

Figure 1:
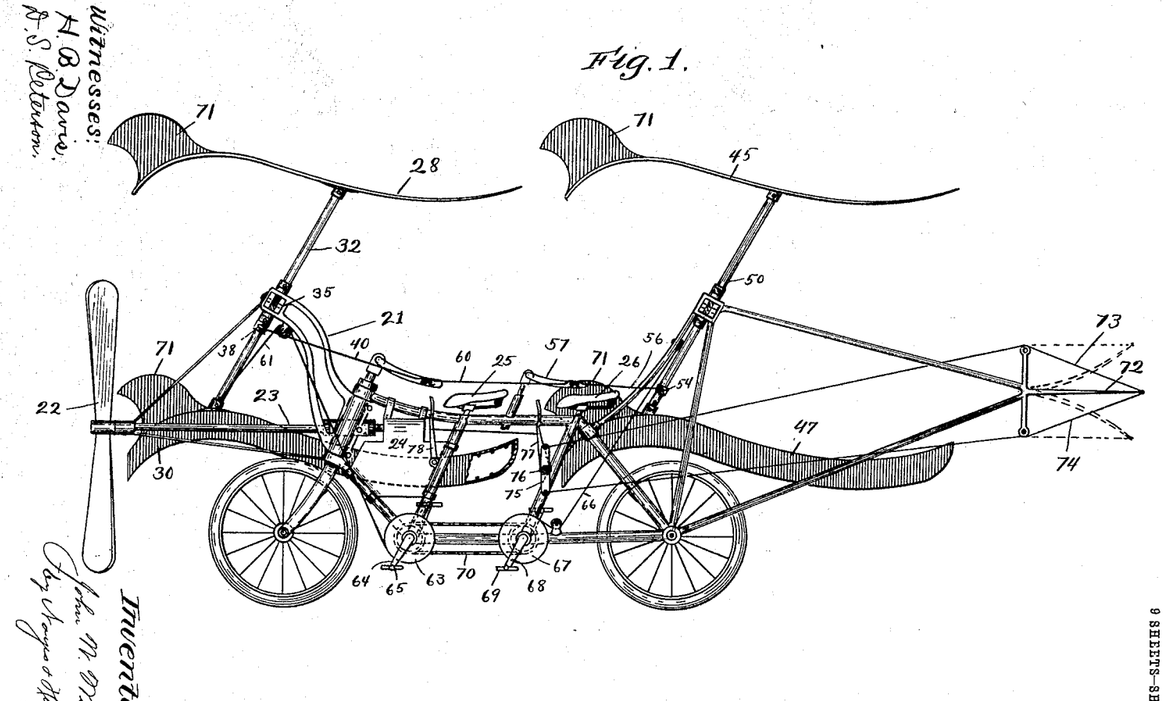
Figure 1 is a side view of a flying-machine embodying this invention, the planes at one side of the machine being removed.
Figure 2:
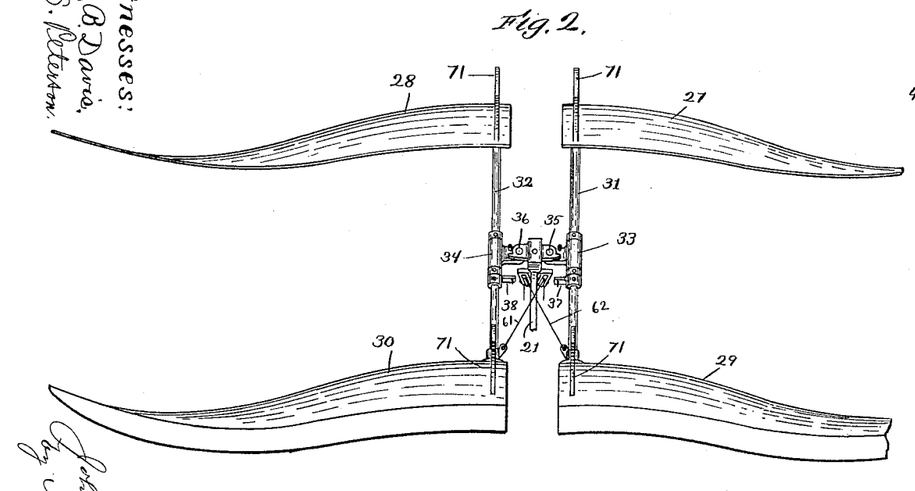
Fig. 2 is a detail showing the planes at the front part of the machine.
Figure 3:
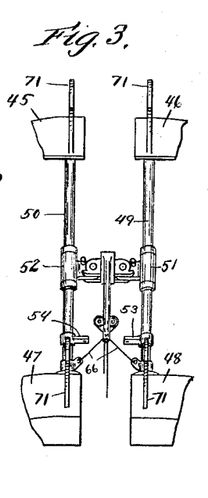
Fig. 3 is a similar view showing a portion of the planes at the rear part of the machine.
Figure 4:
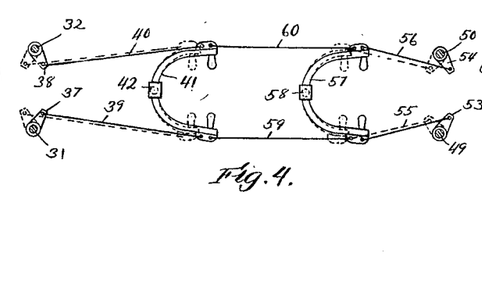
Figs. 4 and 5 are details illustrating the operation of the planes.
Figure 5:
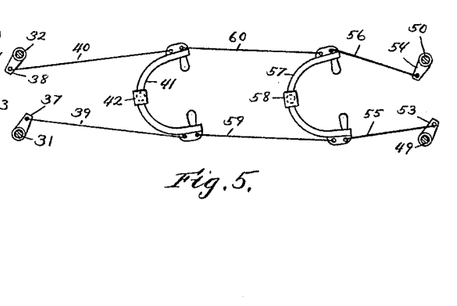

Referring to Fig. 1, the main frame is constructed to provide for two seats, 25 and 26, arranged one in front of the other, although one or more seats may be provided as desired. At the front part of the machine one or more pairs of oppositely-extended planes, of any suitable construction, are provided, 27, 28, representing the planes of one pair, and 29, 30, representing the planes of another pair, the latter being arranged below the former. The planes of each pair are separately supported so as to be moved independently of each other, and, as here shown, they are supported on upright shafts 31, 32, held by suitable bearings, as will be hereinafter described, one pair being arranged at the upper ends of said shafts and the other pair at the lower ends of said shafts, although they may be otherwise disposed on the shafts. They are attached to the shafts at their inner ends, their outer ends being free. The upright shafts, 31, 32, are arranged in parallel, and, as here shown, incline rearwardly from front to rear of the machine, hence are oblique to the perpendicular, and the planes are disposed oblique to the shafts, being substantially horizontal when in normal position. The shafts are mounted in bearing-blocks 33, 34, and are adapted to be turned on their axes in said bearings to thereby move the planes which are supported by them on axes oblique to the perpendicular. The bearing-blocks are connected to the main frame by pivots 35, 36, which provide for movements of the blocks on axes approximately in parallel with the longitudinal axis of the machine. As shown in Fig. 1, said bearing-blocks are arranged to be moved on axes extending in the direction of the length of the machine and at right angles to the axis of the shafts borne by them, being thereby movable on axes approximately in parallel with the longitudinal axis of the machine; but my invention is not limited to the precise angles of said axes relative to the axes of the shafts.

The upright shafts are provided with short arms, 37, 38, which extend inward toward each other, and rods 39, 40, are connected respectively to said arms, and also to manual operating-means, as, for instance, to a pair of handle-bars 41, arranged in an upright steering-head 42, rotatably mounted in the main frame. The handle-bars 41 are arranged in front of one of the seats, as 25, so as to be engaged by an operator sitting on said seat. Movements of the handle-bars in the usual manner of steering, act to pull one of the rods and to push the other, and thereby turn both shafts on their longitudinal axes in the same direction, and to move the planes borne by them on axes oblique to the perpendicular in opposite directions, one forward and the other rearward. Such movements of the planes are utilized to maintain the lateral balance and also to steer the machine around corners. Said planes may be and are here shown as made quite large, so as to serve as supporting-planes as well as balancing and steering-planes.

The handle-bars 41 are mounted on the steering-head so as to rock on a horizontal axis, which result may be accomplished by depressing or raising the extremities of the bars according to the direction of movement required. When rocked in this manner both rods 39 and 40 are moved longitudinally forward and rearward, as the case may be, to thereby turn the upright plane-bearing shafts on their longitudinal axes in opposite directions, operating to move both planes in the same direction; as, for instance, both forward or both rearward. As the shafts are obliquely disposed, it will be observed that when the planes are moved forward, their front edges will be raised, and when moved rearward their front edges will be lowered; and, as the planes are arranged obliquely on their shafts, such angular movements will be increased. When first rising from the ground, both planes will be moved forward and their front edges raised; and, at other times, when it is desired to rise, said planes may be likewise moved and thereafter returned to normal. Separately supporting the planes permits movements thereof in the same direction, and also in opposite directions. While the handle-bar is either depressed or elevated and both planes moved forward or rearward, its rotary movement on a vertical axis is at all times permitted, so that the upright shafts may be turned on their longitudinal axes in opposite directions to move the planes in opposite ways, fore and aft, to maintain lateral balance while rising, and, if desired, to steer the machine.

One or more like pairs of planes may be provided at the rear part of the machine, immediately back of the aforesaid planes, and, as here shown, 45, 46, represent the planes of one pair, and 47, 48, the planes of the other pair, and said planes are arranged obliquely on rearwardly-inclined shafts 49, 50, supported in bearing-blocks, 51, 52, pivotally connected to the main frame, the general construction and arrangement of said rear planes and the supports therefor being substantially the same as the front planes and supports therefor. Said rear planes are designed to be operated in unison with the front planes, and, as here shown, the rearwardly-inclined or oblique shafts, 49, 50, have short arms, 53, 54, extended inwardly from them, to which rods 55, 56, are connected, which extend forward and are connected to a pair of handle-bars 57, supported by an upright steering-head 58 rotatably mounted on the frame, and said handle-bars 57 are connected with the handle-bars 41 by a pair of rods 59, 60, so that, as the front operator turns the handle-bars in front of him, the other handle-bars will be correspondingly turned, and all the rearwardly-inclined or oblique plane-bearing shafts will be turned on their longitudinal axes simultaneously. Said rear planes may also be made of large area to serve as supporting-planes, as well as balancing and steering-planes. The handle-bars 57 are also connected with the steering-head 58, so that they may be rocked on a horizontal axis, like the handle-bars 41, and by the connection between said handle-bars 41 and 57, and between the handle-bars 57 and the upright shafts 49, 50, the rear planes will be moved both forward and rearward, like the forward planes, as above described; and, furthermore, said handle-bars 57 will be rotated on their vertical axes in all the different positions they may occupy, like the forward handle-bars 41, to thereby move the rear planes in opposite ways in all the different forward and rearward positions they may occupy. The bearing-blocks 33, 34, are normally held in vertical positions with respect to the frame, and the upright shafts are in parallel, but said bearing-blocks are movable on their pivots to move the shafts and the planes borne by them. The means provided for moving said bearing-blocks is such that they may be moved on their pivots in all the different positions the shafts may occupy. Movements of the bearing blocks on their pivots cause the extremities of the planes to move in a downward and inward direction, operating to lift the machine a short distance.

The means here shown for moving the bearing-blocks on their pivots consists of cords, 61, 62, attached to the upright shafts 31, 32, near their lower ends, which extend over suitable pulleys to and around a windlass 63 journaled in the frame. A pair of crank-arms 64, 64, are secured to the shaft of the windlass, bearing pedals 65, which are arranged in proper relation to the seat 25, to be engaged by the operator sitting on said seat. By turning the windlass the cords are drawn and the lower ends of the upright shafts moved toward each other, thereby turning the bearing-blocks on their pivots. It will be understood that the planes are held up by the pressure of the air beneath them, so that the cords are normally held taut, and force is required to move the lower ends of the shafts toward each other to move the extremities of the planes in a downward and inward direction, but when the machine is at rest on the ground, the planes will drop a short distance by their own weight and slacken the cords. Other cords, 66, are attached to the lower ends of the upright shafts 49, 50, which extend over pulleys and to and around a windlass 67, journaled in the frame, having crank-arms 68, 68, attached to its shaft, bearing pedals 69, so that the rear planes may be operated in the same manner as the front planes. The two windlasses 63 and 67 are connected by a belt 70, or other means whereby they are caused to operate in unison.

In lieu of the means here shown for supporting the planes, whereby their extremities may be moved in a downward and inward direction, and in lieu of the particular means here shown for moving the planes in this manner, other means may be employed whereby the same results may be obtained.

On top of some or all of the planes, at their forward edges, and midway their length, vertical rudders 71 are preferably arranged, which will be of any suitable construction. As the rudders are arranged on the planes it will be seen that they are moved with the planes, therefore they have all the movements of the planes, as, for instance, they move on axes oblique to the perpendicular, and forward and backward, and also laterally. Said rudders assist in guiding the machine and in controlling its movements. Said rudders may be otherwise supported than on the planes, and movable on axes oblique to the perpendicular.

At the rear of the machine a tail-piece, 72, is arranged, which is made flat and of any suitable dimensions. It is made flexible, so that it may be easily bent transversely, and is attached to a part of the frame-structure. It is arranged horizontally, as shown in full lines Fig. 1, and may be bent transversely in an upward and also a downward direction, as shown by dotted lines Fig. 1. For the purpose of bending it cords 73, 74, are attached to its extremity which extend over suitable pulleys and which are connected to the opposite ends of an upright bar 75, pivoted at 76 to the frame. A lever 77 is secured to the pivot-shaft 76, by which the upright bar may be rocked to pull upon either cord and thereby bend the tail-piece. Said lever 77 may be arranged to be operated by hand or foot and is here shown as located near the rear seat. A like lever 78 is pivoted to the frame near the front seat, which is connected by a rod with the rear lever, so that the two levers will be moved in unison.

I herein provide the machine with floats whereby it may float on the water, so that, if desired, the machine may be caused to light on the water and subsequently rise from the water. In carrying out this part of my invention the lower supporting-planes 29, 30, and 47, 48, are made as floats; that is to say, they are each provided with a water-tight compartment. Referring to Fig. 1, one of said planes having a watertight compartment is broken away to show said compartment. So far as my invention is concerned said floats may be constructed in any suitable manner, but by utilizing the lower supporting-planes for this purpose, lightness is insured. Furthermore, by connecting the floats to the operating-shafts for the supporting-planes, they may be operated the same as the supporting-planes.

Referring to Figs. 6 to 9, inclusive, a flying-machine is shown embodying a modification of my invention. In this embodiment of my invention, the main supporting-planes 80 are arranged on the machine-body, and at the front of the machine a front control is provided, having planes constructed similar to the aforesaid planes, and having similar operating-means.

Figures 6, 7, 8, 9:
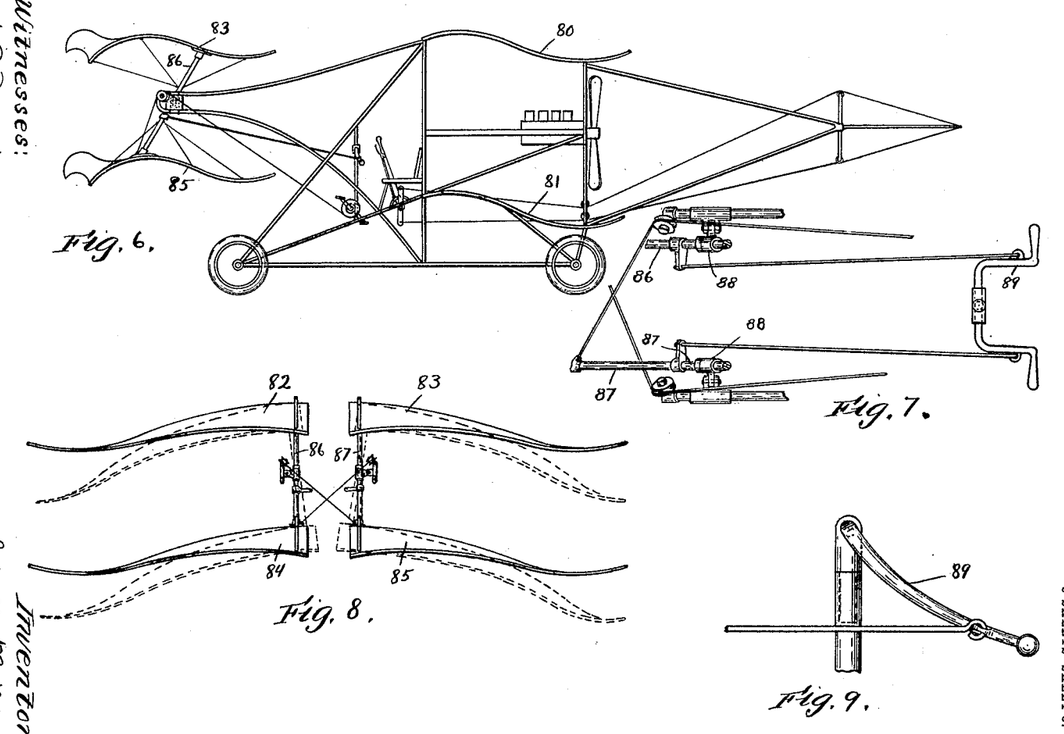
Figs. 6, 7, 8 and 9 are detail views of a machine having embodied in it the principles of my present invention.

Referring particularly to Fig. 8, showing a front view of the front control, 82, 83, represent a pair of upper planes, and 84, 85 a pair of lower planes, and said planes are arranged on a pair of oblique shafts 86, 87, adapted to have all the movements of the oblique shafts heretofore described, and to be operated in a similar manner and for a similar purpose. Therefore my invention embodies the employment of planes which are made smaller than the main supporting-planes, and which are arranged to be operated to control the lateral balance and to steer the machine.

In Fig. 7, the bearing-blocks 88 for the oblique shafts 86, 87, are pivotally supported and the oblique shafts are movable in said bearing-blocks and also on the pivots of said bearing-blocks, in the manner heretofore described.

Referring to Fig. 9, the handle-bars 89 are arranged to be turned and also to be rocked, the same as the handle-bars 41 heretofore described.

Figure 10:
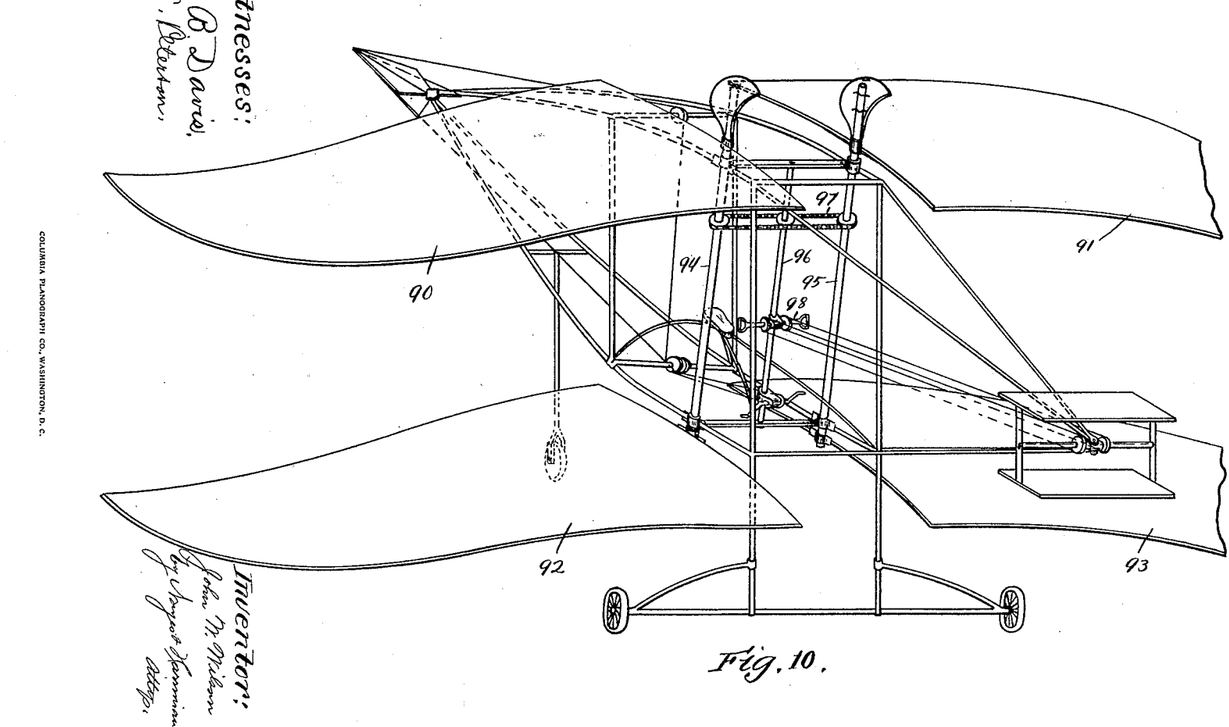
Fig. 10 is a perspective view of another type of machine embodying my invention.

Referring to Fig. 10, the main supporting planes, 90, 91, and 92, 93, are arranged on oblique shafts 94, 95, which are arranged to be turned simultaneously in the same direction by an upright shaft 96, to which they are connected by a sprocket-chain 97, and said shaft 96 is adapted to be turned by hand-pieces 98 secured to it. In this machine the front control is adapted to be rocked by a rotary motion of said hand-pieces 98.

Figures 11, 12, 13, 15:
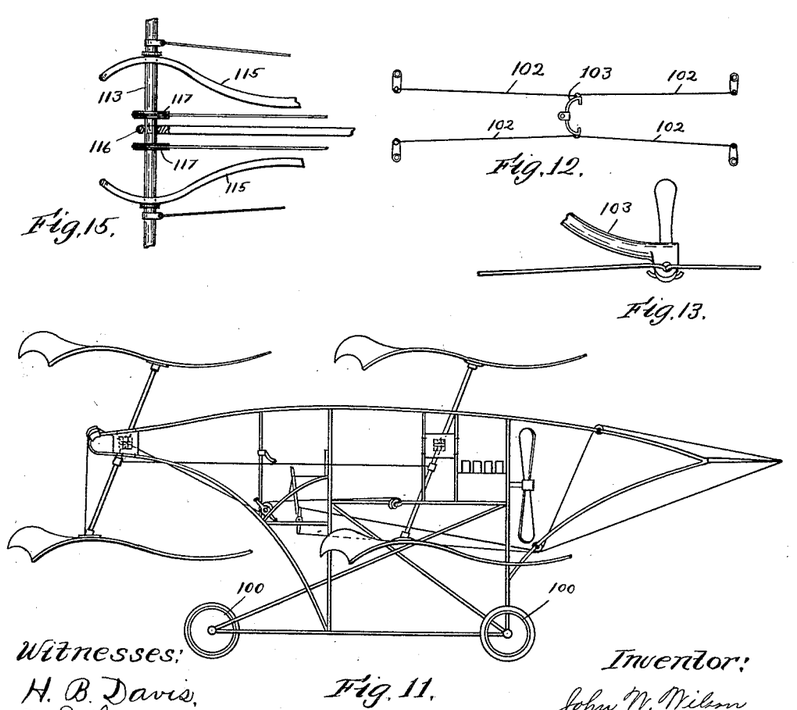

Referring to Fig. 11, a machine is shown similar in construction to the machine shown in Fig. 1, having a frame supporting the ground-wheels 100, and the propeller is arranged at the rear and the machine is provided with a single seat.

In Figs. 12 and 13 the operating-rods 102, for the oblique shafts bearing the planes, are connected to the same handle-bars 103, so that all the planes will be operated simultaneously.

Figure 14:
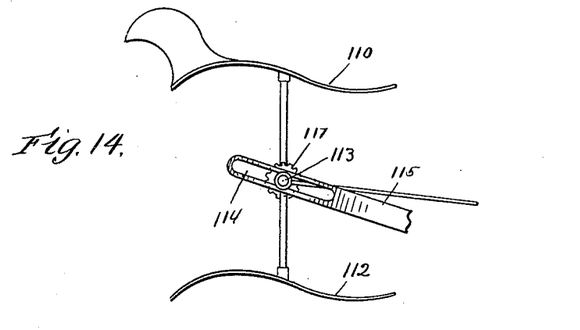

Referring to Figs. 14 and 15, supporting-means for the planes are shown, whereby they may be moved on axes oblique to the perpendicular without employing oblique shafts. In said Figs. 14 and 15, 110, 112 represent the upper and lower planes. They are supported by arms extended from a horizontal shaft 113, which extends through and is adapted to move along in slots 114, formed at the extremities of a pair of arms 115. The arms 115 are arranged in the same plane, but oblique to the perpendicular. 116 represents a middle bar or frame which is held in fixed position between the arms 115, 115. Said horizontal-shaft 113 is adapted to be rocked for the purpose of operating the planes borne by it, and for the accomplishment of this result sprocket-wheels 117 may be secured to it, over which sprocket-chains pass. Said shaft is also adapted to move in the slots in opposite ways, one end portion moving inward and the other outward, and, when so moved, one end portion of the plane is moved in a downward rearward direction, and the other end portion is moved in an upward forward direction, the whole plane-structure swinging on the middle bar 116 as a center. Such movement may be given to the shaft 113 by cords or rods, as 118, attached thereto at its opposite ends. One or more planes may be supported on the horizontal shaft, as desired. This modification of my invention forms the subject-matter of a divisional application Serial #580,695.

Figure 16:
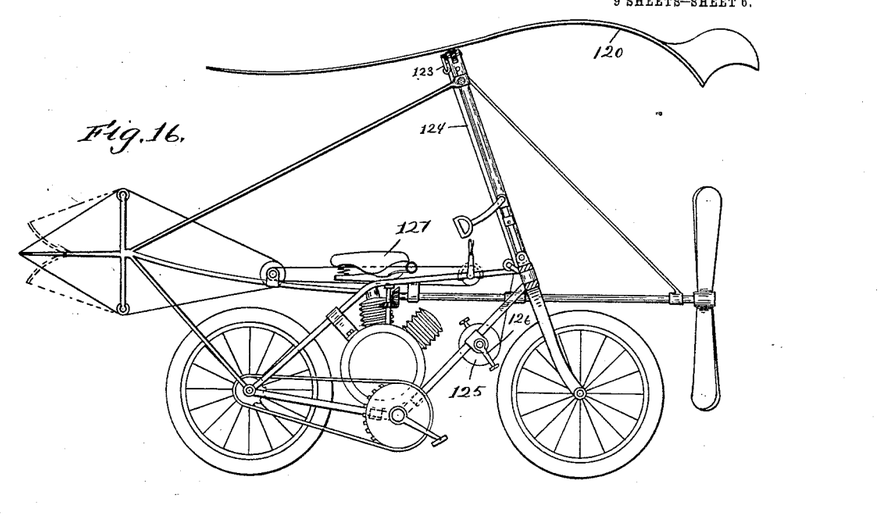
Fig. 16 is a side view of another modification of my invention.
Figures 17, 18:
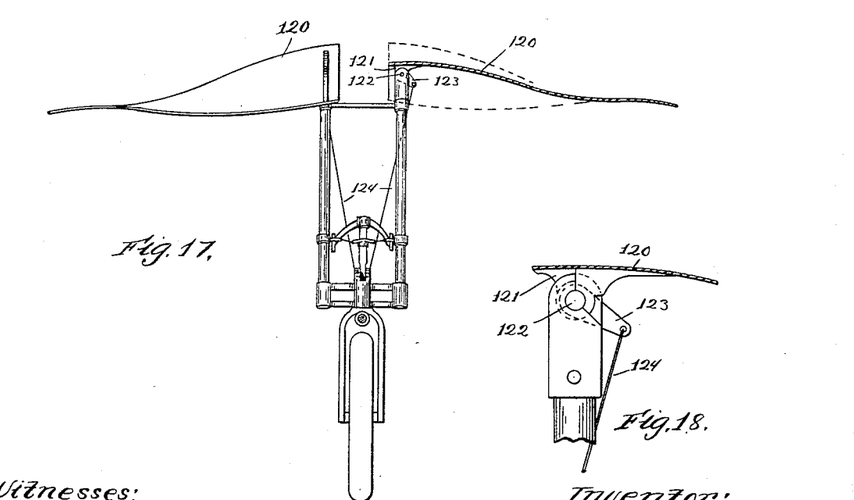

Referring to Figs. 16, 17 and 18, modified means are shown for pivotally supporting the planes, so that they may be moved on axes in parallel with the longitudinal axis of the machine, and the outer ends thereof forced downward suddenly, with a tendency to lift the machine a short distance. In these figures 120, 120, represent the planes arranged on supports 121, pivoted at 122, and short arms 123 are secured to the pivot-shafts to which cords 124 are attached, which extend down over a pulley 125 mounted on the frame, to the shaft of which a pair of pedal-cranks 126 are secured. Said pedal-cranks are arranged so as to be engaged and operated by the feet of the operator sitting on the seat 127. In this embodiment of my invention the planes are secured to separate oblique shafts, and said shafts are arranged to be operated by handle-bars.

Figure 19:
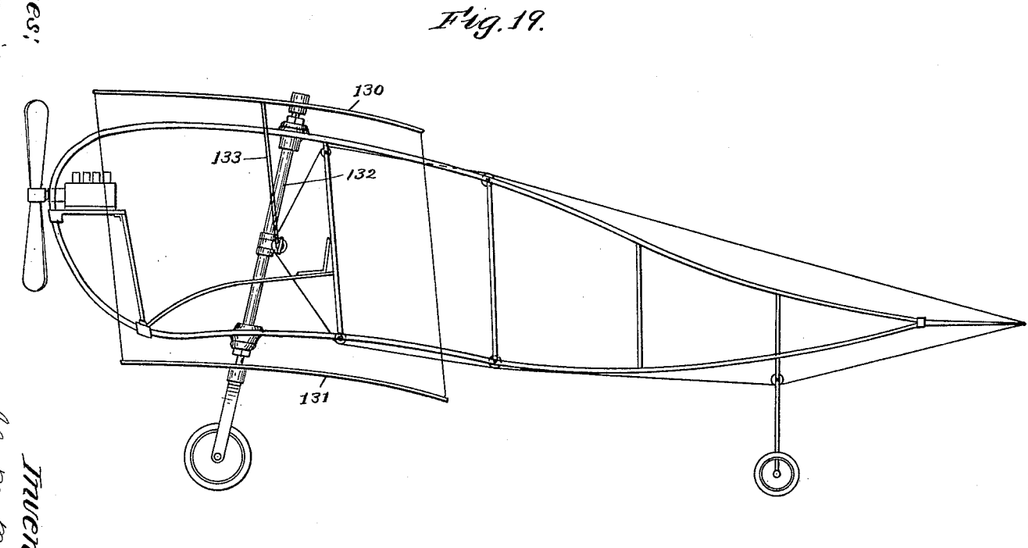
Figure 20:
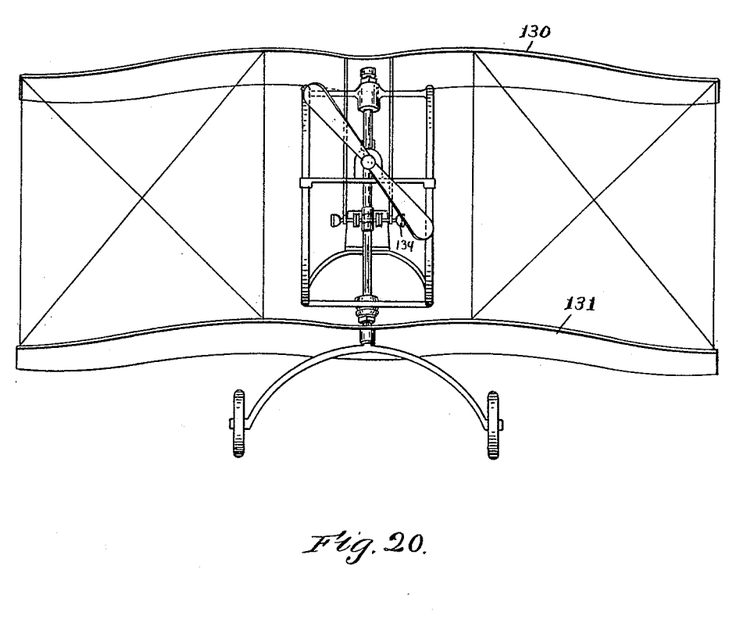
Fig. 20 is a front view of a portion of the machine shown in Fig. 19.

Referring to Figs. 19 and 20, a different type of machine is shown, having upper and lower planes, 130, 131, arranged on a single oblique shaft 132, and adapted to be turned on said shaft as a center. Said oblique shaft is rigidly connected with and forms a part of the frame-structure. Rods 133, 133, are secured to one of the planes, as, for instance, to the upper plane, which extend down along each side of the oblique shaft, and said rods are connected to the opposite ends of the horizontal bars 134, mounted on the oblique shaft or other support. By turning the handle-bars, as in steering, the planes are moved on the oblique shaft and caused to occupy different positions relative thereto. It will be observed that, as one end moves forward and upward, the other end moves rearward and downward. The planes supported in this manner, and provided with means for moving them, may be operated to maintain lateral balance and to steer the machine around corners in addition to serving as supporting-planes.

Figure 21:
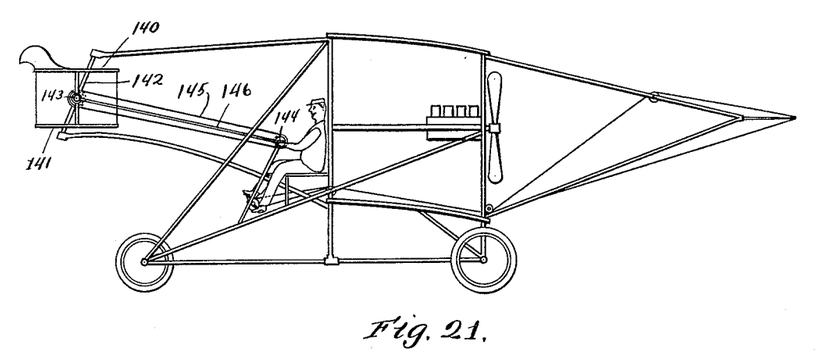
Fig. 21 is a side view of another modification of my invention.
Figure 22:
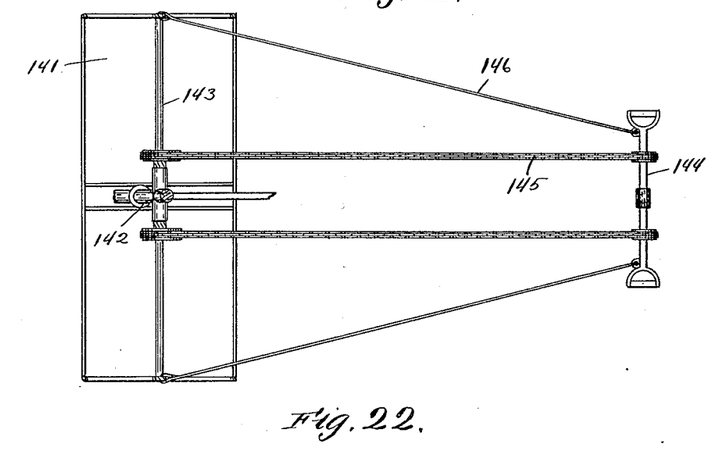
Fig. 22 is a plan view of the front control and means for operating it.

Referring to Figs. 21, 22, planes similar to those shown in Fig. 19 are shown as a front control. In this instance 140, 141, represent the upper and lower planes, and 142 an oblique shaft to which they are secured. Said planes are connected together by any suitable means, and the plane-structure has a horizontal shaft, 143, provided with means for connecting it with the oblique shaft, whereby the planes are connected with said shaft. The horizontal shaft 143 may be rocked to vary the angle of the planes by rotating the handle-bar, 144, which is connected with said shaft 143 by sprocket-chains 145. The plane-structure may be swung on the oblique shaft as a center by pulling upon one or the other rod, 146, which rods are connected to the handle-bar, 144, and, by turning said handle-bar on its pivot, said rods are operated. The modification of my invention shown in said Figs. 19 to 22 inclusive, forms the subject-matter of divisional application Serial No. 580,696.

I claim:

1. In a flying-machine, a pair of oppositely-extended horizontally arranged planes, supported at their inner ends and movable about parallel axes which are oblique to the perpendicular, substantially as described.

2. In a flying-machine, a pair of oppositely-extended horizontally arranged planes, a pair of oblique shafts arranged in parallel to which the inner ends of said planes are attached, and means for turning said shafts to move the planes about axes oblique to the perpendicular, substantially as described.

3. In a flying-machine, a pair of oppositely-extended horizontally arranged planes, a pair of rearwardly-inclined shafts arranged in parallel to which the inner ends of said planes are attached, and means for turning said shafts to move the planes about axes oblique to the perpendicular, substantially as described.

4. In a flying-machine, a pair of oppositely-extended horizontally arranged planes supported at their inner ends and movable about parallel axes which are oblique to the perpendicular, and means for simultaneously moving both planes in the same direction, substantially as described.

5. In a flying-machine, a pair of oppositely-extended planes supported at their inner ends and movable about parallel axes which are oblique to the perpendicular, means for simultaneously moving said planes in opposite ways, fore and aft, and means for simultaneously moving both planes in the same direction, substantially as described.

6. In a flying-machine, a pair of oppositely-extended horizontally arranged planes, oblique shafts arranged in parallel to which the inner ends of said planes are attached, permitting movement thereof about parallel axes which are oblique to the perpendicular, and means for simultaneously turning said shafts to move both planes in the same direction, substantially as described.

7. In a flying-machine, a pair of oppositely-extended planes, oblique shafts arranged in parallel to which the inner ends of said planes are attached, permitting movement thereof about parallel axes which are oblique to the perpendicular, means for simultaneously turning said shafts in the same direction to move said planes in opposite ways, fore and aft, and means for simultaneously turning said shafts in opposite directions, to move both planes in the same direction, substantially as described.

8. In a flying-machine, a pair of oppositely-extended horizontally arranged planes, rearwardly-inclined shafts supporting them, permitting movement thereof about axes oblique to the perpendicular, and means for simultaneously turning said shafts to move both planes in the same direction, substantially as described.

9. In a flying-machine, a pair of oppositely-extended planes, rearwardly-inclined shafts supporting them, permitting movement thereof about axes oblique to the perpendicular, means for simultaneously turning said shafts in the same direction, to move said planes in opposite ways, fore and aft, and means for simultaneously turning said shafts in opposite directions, to move both planes in the same direction, substantially as described.

10. In a flying-machine, a pair of oppositely-extended planes supported at their inner ends and movable about parallel axes which are oblique to the perpendicular, means for simultaneously moving said planes in the same direction, and means for simultaneously moving said planes in opposite ways, fore and aft, in all positions they may occupy, substantially as described.

11. In a flying-machine, a pair of oppositely-extended planes, oblique shafts arranged in parallel to which the inner ends of said planes are attached, permitting movement thereof about parallel axes which are oblique to the perpendicular, means for simultaneously turning said shafts in opposite directions to move both planes in the same direction, and means for simultaneously turning said shafts in the same direction to move said planes in opposite ways, fore and aft, in all positions they may occupy, substantially as described.

12. In a flying-machine, a pair of oppositely-extended planes movable about axes oblique to the perpendicular and also movable about axes approximately in parallel with the longitudinal axis of the machine, substantially as described.

13. In a flying-machine, a pair of oppositely-extended planes movable about axes oblique to the perpendicular, and means for moving both said planes downward about axes approximately in parallel with the longitudinal axis of the machine, substantially as described.

14. In a flying-machine, a pair of oppositely-extended planes, a pair of oblique shafts supporting them, means for turning said shafts to move the planes about axes oblique to the perpendicular, and means for moving said shafts about axes approximately in parallel with the longitudinal axis of the machine, substantially as described.

15. In a flying-machine, a pair of oppositely-extended planes, a pair of rearwardly-inclined shafts supporting them, means for turning said shafts to move the planes about axes oblique to the perpendicular, and means for moving said shafts about axes approximately in parallel with the longitudinal axis of the machine, substantially as described.

16. In a flying-machine, a pair of oppositely-extended planes, a pair of oblique shafts supporting them, means for turning said shafts to move the planes about axes oblique to the perpendicular, and means for simultaneously moving said shafts in opposite ways about axes approximately in parallel with the longitudinal axis of the machine, to move both planes in a downward direction, substantially as described.

17. In a flying-machine, a pair of oppositely-extended planes, a pair of rearwardly-inclined shafts supporting them, means for turning said shafts to move the planes about axes oblique to the perpendicular, and means for simultaneously moving said shafts in opposite ways about axes approximately in parallel with the longitudinal axis of the machine, to simultaneously move the planes in a downward direction, substantially as described.

18. In a flying-machine, a pair of oppositely-extended planes movable about axes oblique to the perpendicular, means for moving said planes in a downward direction about axes approximately in parallel with the longitudinal axis of the machine, and means for moving both planes in the same direction, substantially as described.

19. In a flying-machine, a pair of oppositely-extended planes, oblique shafts supporting them, permitting movement thereof about axes oblique to the perpendicular, means for moving said shafts about axes approximately in parallel with the longitudinal axis of the machine, to move the planes in a downward direction, and means for turning said shafts to move both planes in the same direction, substantially as described.

20. In a flying-machine, a pair of oppositely-extended planes, oblique shafts supporting them, permitting movement thereof about axes oblique to the perpendicular, means for turning said shafts in the same direction to move said planes in opposite ways, fore and aft, means for turning said shafts in opposite directions to move said planes in the same direction, and means for moving said shafts about axes approximately in parallel with the longitudinal axis of the machine, to move said planes downward, substantially as described.

21. In a flying-machine, a pair of oppositely-extended planes, rearwardly-inclined shafts supporting them, permitting movement thereof about axes oblique to the perpendicular, means for moving said shafts about axes approximately in parallel with the longitudinal axis of the machine, to move the planes downward, and means for turning said shafts to move said planes in the same direction, substantially as described.

22. In a flying-machine, a pair of oppositely-extended planes, rearwardly-inclined shafts supporting them, permitting movement thereof about axes oblique to the perpendicular, means for turning said shafts in the same direction to move said planes in opposite ways, fore and aft, means for turning said shafts in opposite directions to move said planes in the same direction, and means for moving said shafts about axes approximately in parallel with the longitudinal axis of the machine to move said planes downward, substantially as described.

23. In a flying-machine, a pair of oppositely-extended planes movable about axes oblique to the perpendicular, means for moving the planes about said axes, and means independent thereof for moving said planes about axes approximately in parallel with the longitudinal axis of the machine in all positions they may occupy, substantially as described.

24. In a flying-machine, a pair of oppositely-extended planes, oblique-shafts supporting them, permitting movement thereof about axes oblique to the perpendicular, means for turning said shafts, and means independent thereof for moving said shafts about axes approximately in parallel with the longitudinal axis of the machine in all positions they may occupy, substantially as described.

25. In a flying-machine, a pair of oppositely-extended planes, rearwardly-inclined shafts supporting them, permitting movement thereof about axes oblique to the perpendicular, means for turning said shafts, and means independent thereof for moving said shafts about axes approximately in parallel with the longitudinal axis of the machine in all positions they may occupy, substantially as described.

26. In a flying-machine, a pair of oppositely-extended planes movable about axes oblique to the perpendicular and having vertical rudders fixed on top of said planes, substantially as described.

27. In a flying-machine, a pair of oppositely-extended planes movable about axes oblique to the perpendicular, and also about axes approximately in parallel with the longitudinal axis of the machine, having vertical rudders fixed thereon, substantially as described.

28. In a flying-machine, vertical rudders arranged at opposite sides of the middle of the machine, separate supports therefor, movable on axes oblique to the perpendicular, and means for moving said rudder-supports, substantially as described.

29. In a flying-machine, vertical rudders arranged at opposite sides of the middle of the machine, separate supports for said rudders, movable on axes oblique to the perpendicular, and means for simultaneously moving said rudder-supports in the same direction, substantially as described.

30. In a flying-machine, one or more vertical rudders and supports therefor, means for moving said rudder-supports to move said rudders in opposite ways, fore and aft, and means for moving said rudder-supports in the same direction, forward and backward and also on axes oblique to the perpendicular, substantially as described.

31. In a flying-machine, one or more vertical rudders movable laterally and also on axes oblique to the perpendicular, substantially as described.

In testimony whereof, I have signed my name to this specification, in the presence of two subscribing witnesses.

JOHN W. WILSON.

Witnesses:
B. J. NOYES,
H. B. DAVIS.

Copies of this patent may be obtained for five cents each, by addressing the "Commissioner of Patents, Washington, D. C."